(12) United States Patent
Han et al.

(10) Patent No.: US 10,607,323 B2
(45) Date of Patent: Mar. 31, 2020

(54) HEAD-MOUNTED ELECTRONIC DEVICE

(71) Applicant: Samsung Electronics Co., Ltd., Suwon-si, Gyeonggi-do (KR)

(72) Inventors: Soon-Seob Han, Seoul (KR); Myong-Jo Choi, Hwaseong-si (KR); Jae-Woo Ko, Uiwang-si (KR); Tae-Kyung Kim, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/068,546

(22) PCT Filed: Jan. 6, 2017

(86) PCT No.: PCT/KR2017/000234
§ 371 (c)(1),
(2) Date: Jul. 6, 2018

(87) PCT Pub. No.: WO2017/119788
PCT Pub. Date: Jul. 13, 2017

(65) Prior Publication Data
US 2019/0026871 A1  Jan. 24, 2019

(30) Foreign Application Priority Data

Jan. 6, 2016 (KR) .................. 10-2016-0001728

(51) Int. Cl.
*G06T 5/00* (2006.01)
*G02B 7/04* (2006.01)
(Continued)

(52) U.S. Cl.
CPC ............. *G06T 5/006* (2013.01); *G02B 3/02* (2013.01); *G02B 3/08* (2013.01); *G02B 7/04* (2013.01); *G02B 7/12* (2013.01); *G02B 27/2242* (2013.01)

(58) Field of Classification Search
CPC combination set(s) only.
See application file for complete search history.

(56) References Cited

U.S. PATENT DOCUMENTS

2008/0106489 A1  5/2008  Brown et al.
2011/0234584 A1  9/2011  Endo
(Continued)

FOREIGN PATENT DOCUMENTS

CN   102271966 A   12/2011
CN   104570355 A   4/2015
(Continued)

OTHER PUBLICATIONS

Chinese Office Action with English translation dated Feb. 3, 2020; Chinese Appln. No. 201780005849.X.

*Primary Examiner* — Maurice L. McDowell, Jr.
*Assistant Examiner* — Donna J. Ricks
(74) *Attorney, Agent, or Firm* — Jefferson IP Law, LLP

(57) ABSTRACT

A head-mounted electronic device according to various embodiments of the present invention may comprise: a curved display; a frame having a mounting surface having a curvature such that the curved display is mounted thereon; and a pair of optical assemblies provided on the left and right sides of the interior of the frame, respectively, so as to provide displayed images to the left and right eyes of the user, the optical assemblies comprising a first lens that forms a view angle of a binocular field of view and a second lens arranged to slope with regard to the first lens, thereby forming an additional view angle of the left or right field of view. In addition, the above head-mounted electronic device may be implemented variously according to embodiments.

11 Claims, 17 Drawing Sheets

(51) Int. Cl.
    *G02B 3/02*   (2006.01)
    *G02B 3/08*   (2006.01)
    *G02B 7/12*   (2006.01)
    *G02B 27/22*  (2018.01)

(56) References Cited

U.S. PATENT DOCUMENTS

| | | | |
|---|---|---|---|
| 2011/0285848 A1 | 11/2011 | Han et al. | |
| 2012/0120498 A1* | 5/2012 | Harrison | G02B 3/08 |
| | | | 359/630 |
| 2015/0138645 A1* | 5/2015 | Yoo | G02B 27/0101 |
| | | | 359/630 |
| 2015/0279114 A1 | 10/2015 | Yonekubo | |
| 2016/0377870 A1* | 12/2016 | Pilkinton | G02B 27/0172 |
| | | | 345/8 |
| 2018/0098048 A1* | 4/2018 | Kura | G02B 27/0172 |
| 2018/0261146 A1* | 9/2018 | Van 'T Hooft | G02B 27/0172 |

FOREIGN PATENT DOCUMENTS

| | | | | |
|---|---|---|---|---|
| CN | 104590115 A | 5/2015 | | |
| CN | 204595338 U | 8/2015 | | |
| CN | 104991340 A | 10/2015 | | |
| KR | 20-0307961 Y1 | 3/2003 | | |
| KR | 200307961 | * | 3/2003 | G02C 9/04 |
| KR | 10-2014-0025121 A | 3/2014 | | |
| KR | 1020140025121 A | * | 3/2014 | G02B 27/02 |
| KR | 10-2014-0045292 A | 4/2014 | | |
| KR | 10-2015-0112852 A | 10/2015 | | |
| KR | 10-2015-0145219 A | 12/2015 | | |
| WO | 2010/079912 A1 | 7/2010 | | |

* cited by examiner

<IMAGE VIEWED FROM CENTER
BEFORE CORRECTION>

<IMAGE OF DISCONTINUOUS SECTION
IN RIGHT DIRECTION BEFORE CORRECTION>

<IMAGE IN RIGHT DIRECTION
AFTER CORRECTION>

HEAD-MOUNTED ELECTRONIC DEVICE

CROSS-REFERENCE TO RELATED APPLICATION(S)

This application is a National Phase Entry under 35 U.S.C. § 371 of PCT International Application No. PCT/KR2017/000234, which was filed on Jan. 6, 2017, and claims priority to Korean Patent Application No. 10-2016-0001728, which was filed in the Korean Intellectual Property Office on Jan. 6, 2016, the entire contents of each of which are incorporated herein by reference.

BACKGROUND

1. Field

Various embodiments of the present disclosure relate to an electronic device, for example, a head-mounted-type electronic device including, for example, a curved display.

2. Description of the Related Art

Among electronic devices, some electronic devices are provided in a form that can be worn on a body of a user. Such electronic devices are typically referred to as wearable devices. Examples of wearable electronic devices include a head-mounted display, smart glasses, a smart watch or wristband, a contact lens-type device, a ring-type device, a footwear-type device, a garment-type device, a glove-type device, and the like, and may have various forms capable of being detached from/attached to a part of a human body or clothes. The wearable electronic device is directly worn on a human body, so that portability and a user's accessibility can be improved.

As an example of the above wearable electronic device, there is a Head Mounted Display or Head Mounted Device (HMD) that can be mounted on a wearer's head portion or head. The HMD may be roughly classified into a see-through-type HMD providing augmented reality (AR) and a see-closed type HMD providing virtual reality (VR).

A typical example of a see-through type HMD is Google Glass. Using the characteristics of semi-transmissive lenses, Google Glass can synthesize and combine a virtual object or a thing on the basis of the real world to reinforce and provide additional information that is difficult to obtain only in the real world. A representative example of the see-closed type HMD is a Sony HMZ. The Sony HMZ is an electronic device in which two displays are placed in front of a user's eyes and is able to provide an excellent immersive feeling by allowing contents (games, movies, streaming, broadcasts, etc.) provided through external input to be viewed alone on a separate screen.

SUMMARY

Conventional head-mounted electronic devices provide stereoscopic regions in both eyes, i.e. a viewing angle of about 100 to 120 degrees. However, in general, a visual field that a person perceives is about 200 degrees, and conventional head-mounted electronic devices provide a viewing angle of about 100 to 120 degrees, which is narrower than a viewing angle that a person generally perceives.

Accordingly, when a high-level application such as video images and 3D contents is executed through a head-mounted electronic device, the user confirms the screen with a viewing angle narrower than the viewing angle recognized by the user. Thus, the user may feel uncomfortable since it feels as if the user is seeing an image through a periscope, and there is a limitation in feeling the reality of virtual reality (VR).

Accordingly, when a user uses a head-mounted electronic device to execute a high-level application such as video images and 3D contents, there is a need to implement an ultra-wide angle such as a human's viewing angle of about 180 degrees including a peripheral visual field as if the view is seeing reality.

However, in order to implement an ultra-wide angle virtual reality of about 180 degrees in a head-mounted electronic device, a display and an optic size are inevitably increased. The increase in display and optic size in a head-mounted electronic device means that the size of the head-mounted electronic device is increased and the weight is increased, which may make it inconvenient for the user to wear or use the head-mounted electronic device and may prevent the user from using the head-mounted device for a long time or may weigh heavily on the user's body when using the head-mounted device for a long time.

Accordingly, various embodiments provide a head-mounted electronic device, which can be optimized for a face shape in order to implement an ultra-wide angle such as a human's viewing angle, can be implemented in a slim form even though the ultra-wide angle is implemented, and can be minimized in the weight thereof.

A head-mounted electronic device according to various embodiments may include: a curved display; a frame having a mounting surface having a curvature such that the curved display is mounted thereon; and a pair of optical assemblies provided on the left and right sides of the interior of the frame, respectively, so as to provide displayed images to the left and right eyes of the user, the optical assemblies including a first lens that forms a view angle of a binocular visual field and a second lens arranged to slope with regard to the first lens, thereby forming an additional view angle of the left or right visual field.

With a head-mounted electronic device according to various embodiments, it is possible to configure a curved display having a curvature optimized for a user's face shape using a flexible display curved to be capable of covering the portion of a binocular visual field of 90 to 120 degrees and the portions of left and right peripheral visual fields and to implement a viewing angle of 180 degrees while surrounding the whole visual field of the user.

In addition, since the flexible display is implemented by dividing lens of the optical assembly into a binocular visual field portion and the left and right peripheral visual field portions, it is possible to implement an ultra-wide viewing angle, to make the size of the head-mounted electronic device slim, and to minimize the weight of the head-mounted electronic device, so that the user can easily wear or use the head-mounted electronic device.

Further, it is possible to confirm a seamless image within a viewing angle by performing image overlapping and correction on an image distortion portion along connecting portions between a first lens that implements a binocular visual field portion in a flexible display and a second lens that forms the left and right peripheral visual field portions while being connected to be inclined with respect to the first lens.

BRIEF DESCRIPTION OF DRAWINGS

The above and other aspects, features and advantages of the present disclosure will be more apparent from the following detailed description taken in conjunction with the accompanying drawings, in which.

DETAILED DESCRIPTION

Figure 1A:
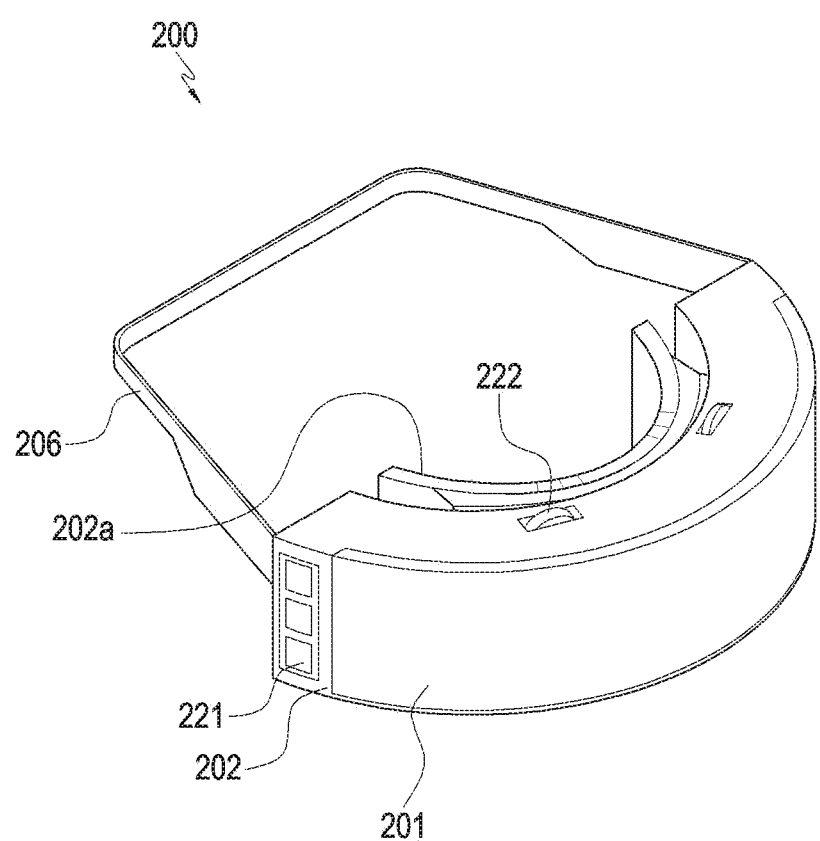
FIG. 1A is a schematic perspective view of a head-mounted electronic device according to various embodiments in an assembled state.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

The terms used in the present disclosure are only used to describe specific embodiments, and are not intended to limit the present disclosure. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

The electronic device according to various embodiments of the present disclosure may be a combination of one or more of the aforementioned various devices. Further, the electronic device according to various embodiments of the present disclosure may be a flexible device. Further, it will be apparent to those skilled in the art that the electronic device according to various embodiments of the present disclosure is not limited to the aforementioned devices.

The term "user" as used in the description of various embodiments may refer to a person using an electronic device or a device using an electronic device (e.g., an artificial intelligence electronic device). The term "wearer" as used in the descriptions of various embodiments may refer to a person who wears a head-mounted electronic device on his or her head and uses a content provided by the head-mounted electronic device or by an electronic device removably mounted on the head-mounted electronic device.

Figure 1B:
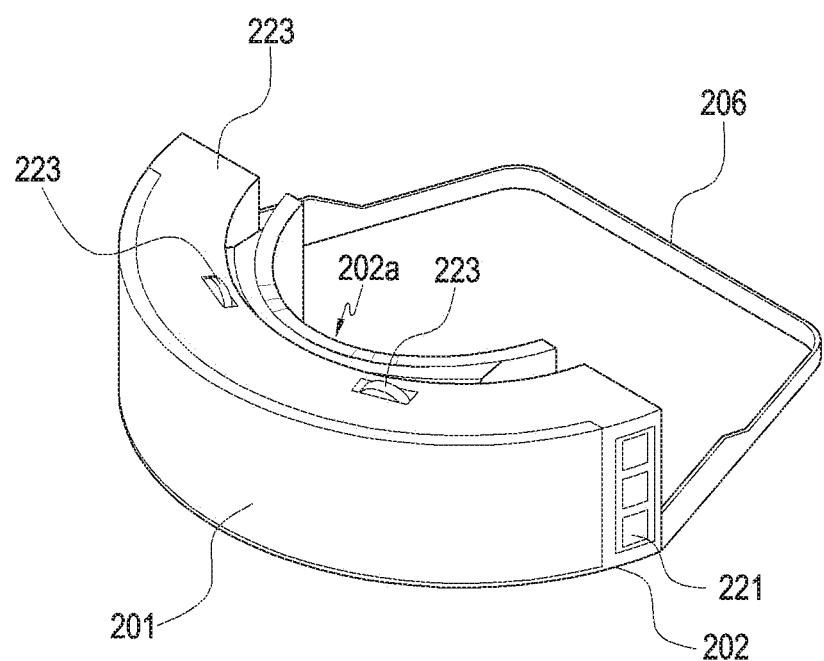
FIG. 1B is a schematic bottom side perspective of the head-mounted electronic device according to various embodiments.
Figure 1C:
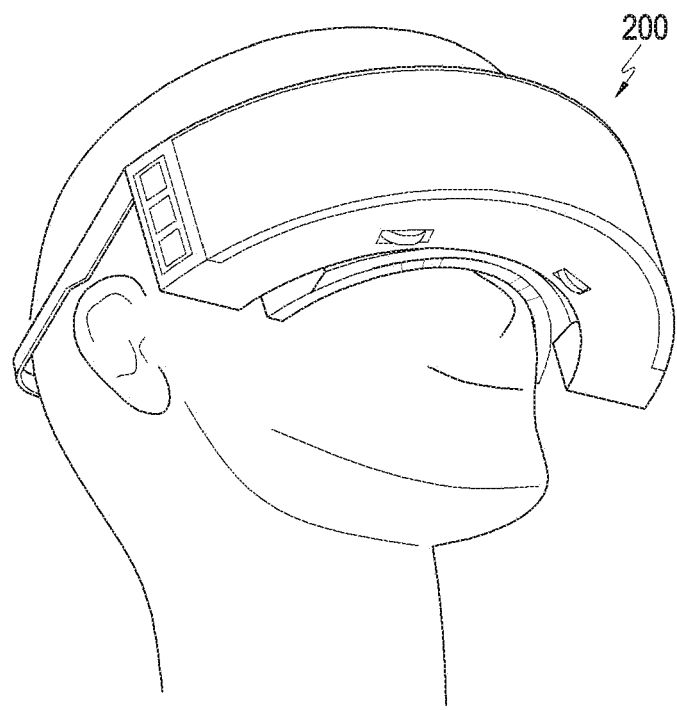
FIG. 1C is a view illustrating the wearing state of the head-mounted electronic device according to various embodiments.

FIG. 1A is a schematic perspective view of a head-mounted electronic device according to various embodiments in an assembled state. FIG. 1B is a schematic bottom side perspective of the head-mounted electronic device according to various embodiments. FIG. 1C is a view illustrating the wearing state of the head-mounted electronic device according to various embodiments.

Referring to FIGS. 1A to 1C, a head-mounted electronic device 200 (also referred to as an "HMD") according to one embodiment may be provided as a display device including at least one of a display 201 that displays a screen such as an image and a transparent/translucent lens, or may be provided to be fixed to the user's head and to be capable of selectively implementing a user interface.

A display device having a display 201 according to one embodiment (hereinafter, referred to as a "display 201") may be provided in the state of being fixed to the frame 202, or may be provided removably.

The head-mounted electronic device 200 of the present disclosure may provide at least one of a see-through function that provides Augmented Reality (AR) or a see-closed function that provides Virtual Reality (VR).

The see-through function may generally mean a function of transmitting, for example, a information and images of an actual external thing(s) to the user's eyes through the display 201 or the transparent/translucent lens, and providing an image of the thing(s) or a virtual object or thing to the user using visual or various sensory means. According to the see-through function, it is possible to provide the user with additional information and images about actually visible things and the like. In another embodiment, it is possible to provide additional information to the user using hologram or the like without the display 201 or a lens.

The seed-closed function may be provided by a separate display 201. In one embodiment, the head-mounted electronic device 200 may be configured such that two displays 201 are placed in front of the user's eyes to allow the user to see contents (games, movies, streaming, broadcast, etc.) provided through the displays 201. This may provide an immersive feeling to the user using an independent screen.

Figure 2A:
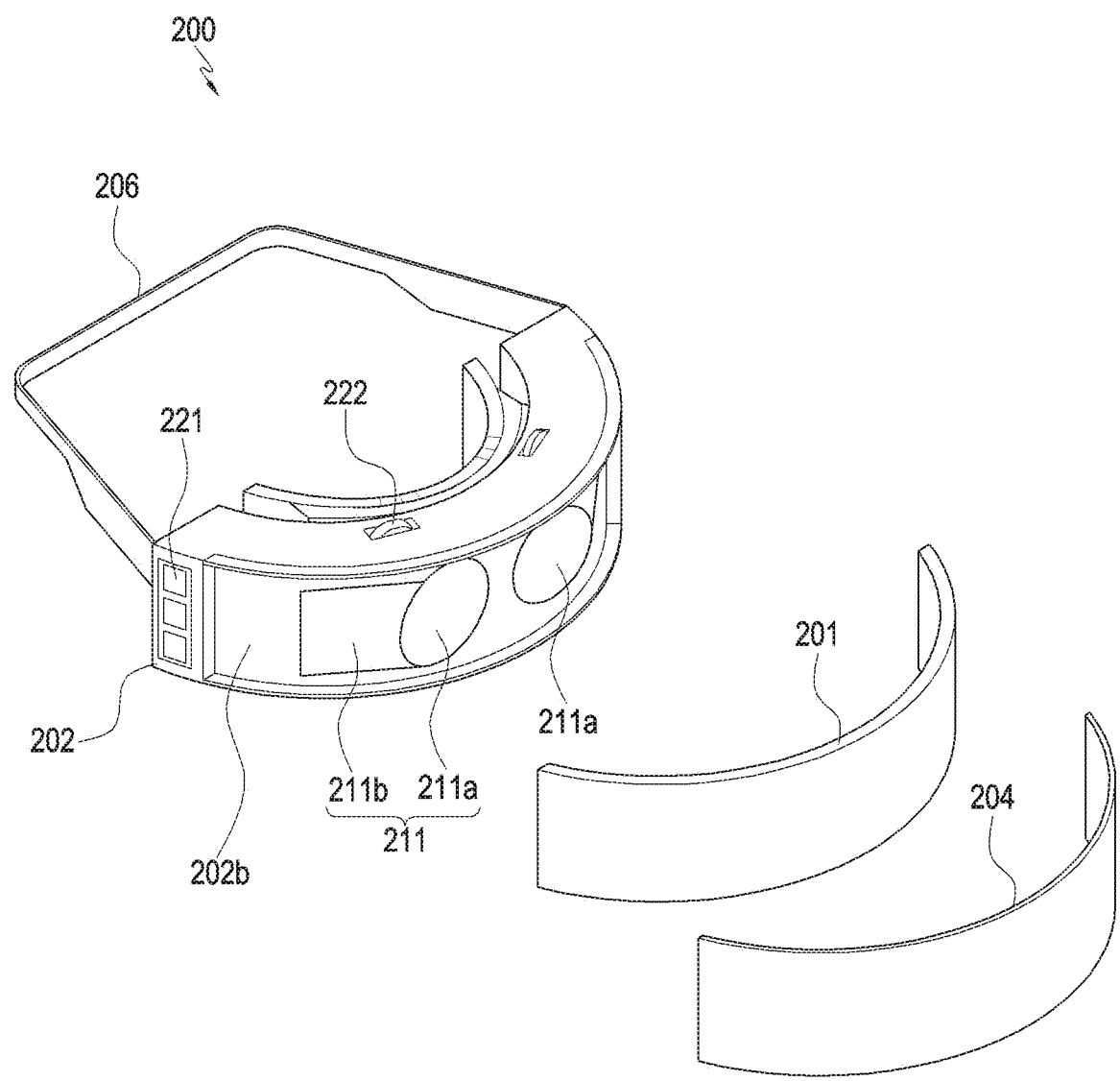
FIG. 2A is an separated perspective view of the head-mounted electronic device according to various embodiments of the present disclosure.
Figure 2B:
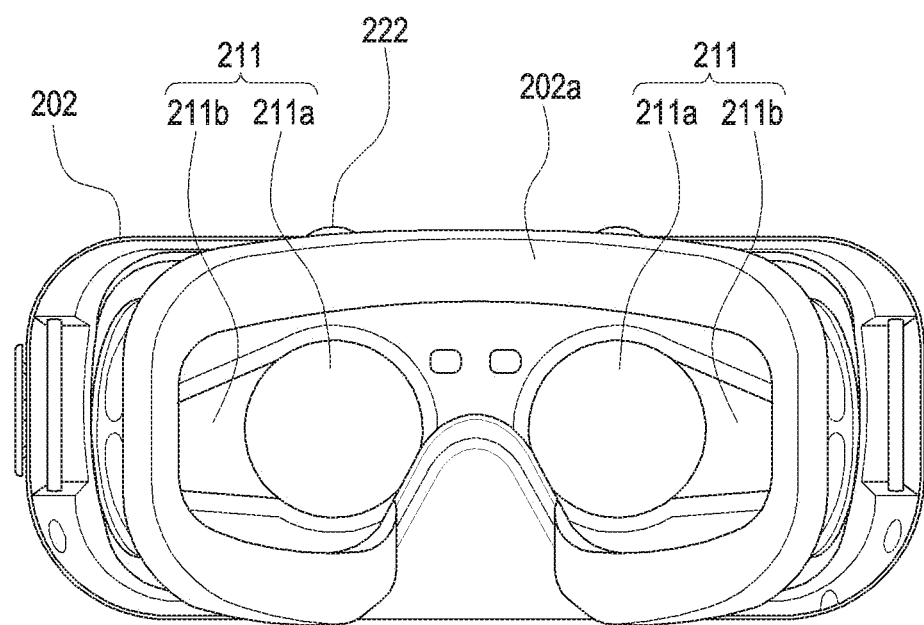
FIG. 2B is a view illustrating the inner portion of the head-mounted electronic device according to various embodiments in the mounting direction by the user.
Figure 2C:
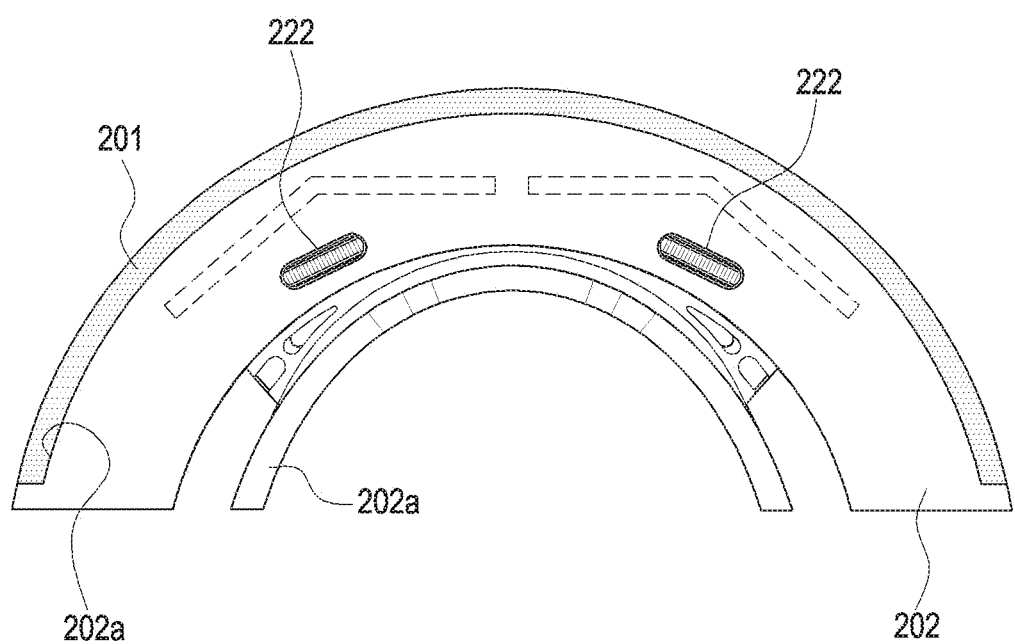
FIG. 2C is a view illustrating the upper face of the head-mounted electronic device according to various embodiments.

FIG. 2A is a separated perspective view of the head-mounted electronic device according to various embodiments of the present disclosure. FIG. 2B is a view illustrating the inner portion of the head-mounted electronic device according to various embodiments in the mounting direction by the user. FIG. 2C is a view illustrating the upper face of the head-mounted electronic device according to various embodiments. Referring to FIGS. 2A to 2C, the head-mounted electronic device 200 according to one embodiment may include a curved display 201, a frame 202, and an optical assembly, and may further include a cover member 204 capable of covering the display.

The curved display 201 may be provided in a rounded shape to surround the user's face by being curved in such a manner that the opposite end portions thereof have a predetermined curvature (hereinafter, referred to as a "first curvature") so as to provide a screen suitable for the viewing angle of the user, or the entire face of the curved display 201 is curved so as to have the first curvature. The curved display 201 may be flexibly provided and fixedly coupled to the frame 202 having the first curvature to be described later. In addition, the opposite curved end portions of the curved display 201 may have a size capable of covering a viewing angle so as to provide the screen at viewing angles of the left and right eyes of the user. The curved display 201 according to one embodiment may be formed in a hemispherical shape or a semi-elliptical shape.

In addition, the display 201 according to one embodiment may be provided as a device separate from the head-mounted electronic device 200 to be removably mounted on the head-mounted electronic device 200 separately. Unlike this, the display 201 may be fixed to the head-mounted electronic device 200 or may be provided as a partial component of the head-mounted electronic device 200.

The frame 202 is a structure to be worn on the user's face. The display 201 and the optical assembly may be mounted on the frame 202, and a lens frame 212, a support, a control module, an image correction processing unit, a focus adjustment guide, a lens adjustment guide, and the like may also be mounted on the frame 201.

For example, the frame 202 may include a space or a structure in which various control modules, the image correction processing unit, the display 201, the optical assembly 210, the lens frame 212, and the like can be accommodated. One face of the frame 202 may be formed as a face contact surface 202a that faces and is worn on the user's face, and the other face of the frame 202 may be formed as a mounting surface 202b on which the display 201 is mounted.

The face contact surface 202a may be located on at least one face of the frame 202, specifically the rear face of the frame 202 that faces the user's face. That is, when the head-mounted electronic device 200 is worn on the user's face, the face contact surface 202a is brought into contact with the user's face. The face contact surface 202a may have a structure corresponding to the curve of the user's face, may be in close stable contact with the user's face, and may at least partially include an elastic body so as to discharge moisture generated by heat or the like generated from the user's body. A portion of the face contact surface 202a may include a nose recess having a shape into which the user's nose can be inserted.

The mounting surface 202b may be provided on at least a portion of the frame 202, specifically on the front face of the frame 202, and may include a space on the front face of the frame 202 in which the curved display 201 can be introduced and mounted. Depending on the type of mounting the curved display 201 on the mounting surface 202b, the curved display 201 may be implemented in at least one of a fixed type in which the curved display 201 fixedly mounted on the frame 202 and a removable type in which the curved display 201 is removably mounted on the frame 202.

For example, when the curved display 201 is removably mounted on the mounting surface 202b, the mounting surface 202b may have a mechanical structure capable of removably mounting the curved display 201 (corresponding to the removable type). For example, when the display 201 has a mechanical structure that is removable from the mounting surface 202b, a space, which is configured to seat the display 201 therein or to release the seating of the display 201 therefrom, is formed in the mounting surface 202b, and connectors for electrical coupling between the display 201 and the head-mounted electronic device 200 may be disposed at predetermined positions along the space. For example, the first terminal of the connectors may be provided at least at a predetermined position of the display 201, for example, at a position in the non-screen region of the display 201, and the second terminal of the connectors may be provided at the positions corresponding to the first terminal on the mounting surface 202b to be electrically connected to the first terminal.

In addition, a latching member may be provided to hold the display 201 in the space formed in the mounting surface 202b when the display 201 is seated in the space or to release the seating state. In addition, a cover member 204 may be further provided to cover the display 201 in the state in which the display 201 is fixed to the mounting surface 202b.

Unlike this, when the curved display 201 is provided in the state of being fixed to the mounting surface 202b, the mounting surface 202b may have a mechanical structure capable of fixedly mounting the curved display 201 (corresponding to the fixed type). For example, when the display 201 has a mechanical structure fixed to the mounting surface 202b (corresponding to the fixed type), the mounting surface 202b may be provided with a coupling member such that the display 201 can be seated on and fixed to the mounting surface 202b. For example, a coupling member such as an adhesive may be provided along the non-screen region of the rim of the display 201 to be fixedly coupled with the mounting surface 202b. In addition, when the display 201 is coupled to the mounting surface 202b, the display 201 may be connected by the connectors 201c and 202c so as to be electrically coupled to the head-mounted electronic device 200. For example, the display 201 and the head-mounted electronic device 200 may be electrically connected through a flexible circuit board, or may be electrically connected by the above-mentioned first and second terminals that are in electrical contact with each other.

The mounting surface 202b may be formed as a curved surface with a predetermined curvature such that the display 201, which is curved in a semi-spherical or semi-elliptic shape, can be mounted thereon. In addition, the mounting surface 202b may be formed in the frame 202 such that the curved display 201 may be mounted to provide a screen to correspond to a viewing angle of the user between 180 degrees and 200 degrees. The size of the mounting surface 202b according to one embodiment may be formed to correspond to the size of the curved display 201, which in turn corresponds to the front circumferential size of the face.

The mounting surface 202b may include a flexible material or a deformable material such as an elastic material capable of deforming the size of the space. Since the mounting surface 202b includes a flexible or deformable material, when the display 201 is seated on and fixed to the mounting surface 202b, the display 201 may be brought into close contact with the mounting surface 202b without generating a scratch or a damage on the display 201. The mounting surface 202b may be provided with the above-described connectors 201c and 202c, a cover member 204 for covering the rear face of the display 201, or a supporting portion 217 for tightly fixing the display 201 to the mounting surface 202b.

As described above, the frame 202 and the display 201 may be each provided with a pair of connectors such that the display 201 can be electrically connected when the display 201 is provided on one face of the frame 202. The connectors may be provided to connect the head-mounted electronic device 200 and the display 201 to each other such that the head-mounted electronic device 200 and the display 201 are able to communicate with each other. The connectors may be provided with a flexible circuit board or a terminal so that the display 201 may be electrically connected to the head-mounted electronic device 200. Unlike this, the connectors may include a first terminal be provided on the curved display 201 to be connected not only to the frame 202 of the head-mounted electronic device 200, but also to a battery charger or an external device, and a second terminal provided on the frame 202 at a position corresponding to the first terminal. Thus, when the display 201 is mounted on the front face of the frame 202, the first terminal and the second terminal can be electrically connected to each other by being contacted with or connected to each other.

The frame 202 may include a relatively lightweight material, such as plastic, for the user's wearability. However, the material of the frame 202 is not limited thereto. As another embodiment of the material of the frame 202, the frame 202 may include at least one of a variety of different materials, for example, glass, ceramic, a metal such as aluminum, or an alloy such as steel, stainless steel, titanium or magnesium alloy in order to ensure strength or beautiful appearance.

The frame 202 may include, for example, a control device 220 such as a touch panel, on a portion of the outer face thereof as a user interface. The control device 220 may be included on the outer face of the frame 202 so as to adjust the position of one or more displays 201 or adjust the positions of the lenses.

The control device 220 may be installed on at least a portion of the frame 202, for example, on the outer side face of the frame 202. The control device 220 may be provided as an input member 221 for allowing the wearer to control the input of the head-mounted electronic device 200, to control the display 201, or to control input to the head-mounted electronic device. For example, the control device 220 may be an adjustment device (not illustrated) for adjusting the position of the display 201 and may be an adjustment unit (a first position adjustment unit 222 or a second position adjustment unit 223) for adjusting the position of the optical assembly 210. The control device 220 may include at least one of a physical key, a physical button, a touch panel, a joystick, a button, a wheel key, and a touch pad according to functions and the like. For example, when the control device 220 is provided as the input member 221, the control device 220 may be provided as a touch panel, a physical key, a joystick, or the like, and may receive a touch input or a push input of the user. Here, the touch input may be an input, which is performed by the user by directly touching the touch panel or a hovering input, which is performed in proximity to the touch panel. The input member 221 may display a Graphical User Interface (GUI) that can control the function of the display 201. For example, a GUI that controls sound or video may be displayed.

Unlike this, the control device 220 may be an adjustment device for adjusting the mounting position of the curved display 201. In this case, the control device 220 may be provided in order to make the position of the display 201 variable on the mounting surface 202b in the state in which the display 201 is seated on the mounting surface 202b, and may be implemented as a joystick, a wheel, or the like by being connected to the outside of the frame 202 between the display 201 and the mounting surface 202b.

In addition, the control device 220 may be implemented as an adjustment unit for adjusting the optical assembly 210. A specific structure of the configuration in which the control device 220 is implemented as an adjustment unit for adjusting the optical assembly 210 will be described later.

As described above, the curved display 201 may provide various forms of virtual reality to the user wearing the head-mounted electronic device 200 by reproducing an image or the like. The curved display 201 may receive input transmitted through the input member 221 such as a touch panel provided outside the frame 202 in a state of being mounted on the front side of the frame and being electrically connected to the frame 202, and may drive the function corresponding to the input or may perform display on the screen in response to the input received from the input member 221. For example, the display 201 may adjust a volume or control image reproduction in response to the received touch input.

The curved display 201 may be a portable electronic device 200, for example, a smart phone, the front face of which is made of a flexible material to have a curved screen portion for reproducing a screen, or a smart phone having a curved screen portion. That is, the screen portion side of the flexible smart phone or the smart phone having a curved screen portion may be removably mounted on the mounting surface 202b of the device so as to face the optical assembly 210 of the frame 202. The user may cover the cover 204 so as to fix the display 201 to the device. Unlike this, the curved display 201 may be configured with a flexible OLED panel, and may be fixedly mounted on the mounting surface 202b of the frame 202.

The head-mounted electronic device 200 according to one embodiment may include a cover member 204, which may be provided to be removably mounted on the front face of the frame 202 so as to cover the curved display 201 mounted on the mounting surface 202, or may be provided to be fixed to the front face of the frame 202. The curved display 201 may be provided such that the rear face of the curved display 201 can be covered and the state in which the curved display 201 is mounted on the mounting surface 202b can be maintained.

For example, when the curved display 201 is detached from/attached to the mounting surface 202b of the frame 202, the cover member 204 may also be detached from/attached to the front face of the frame 202, and when the display 201 is fixedly provided on the mounting surface 202b of the frame 202, the cover member 204 may be provided to be fixed to the front face of the frame 202.

It is described, as an example, that the cover member 204 is provided on one face of the frame 202 according to one embodiment so as to cover the display 201 and to maintain the mounting state of the display 201, but the present disclosure is not limited thereto. For example, when a structure capable of holding portable electronic devices 200 on the opposite sides of the mounting surface 202b is provided, the cover member 204 may not be separately provided.

The support 206 may be a mechanical member that can be used by the user to wear the electronic device 200 on the head. The support 206 of the present disclosure may include, for example, a band, eyeglass temples, a helmet, straps, or the like, which is formed of an elastic material. The support 206 may be provided such that the frame 202 is in close contact with the periphery of the eyes on the user's face.

Figure 3:
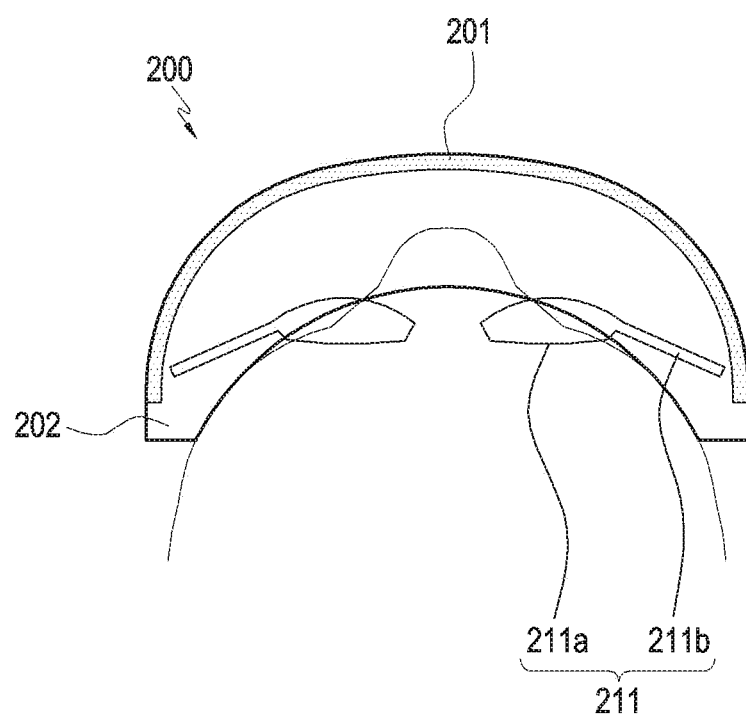
FIG. 3 is a view illustrating the wearing state of the head-mounted the electronic device according to various embodiments of the present disclosure in another direction.
Figure 4:
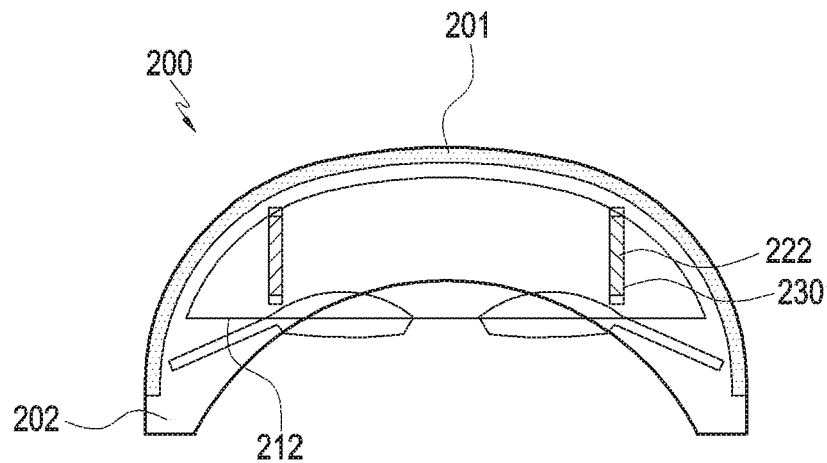
FIG. 4 is a view schematically illustrating the inner portion of the head-mounted electronic device according to various embodiments of the present disclosure.
Figure 5:
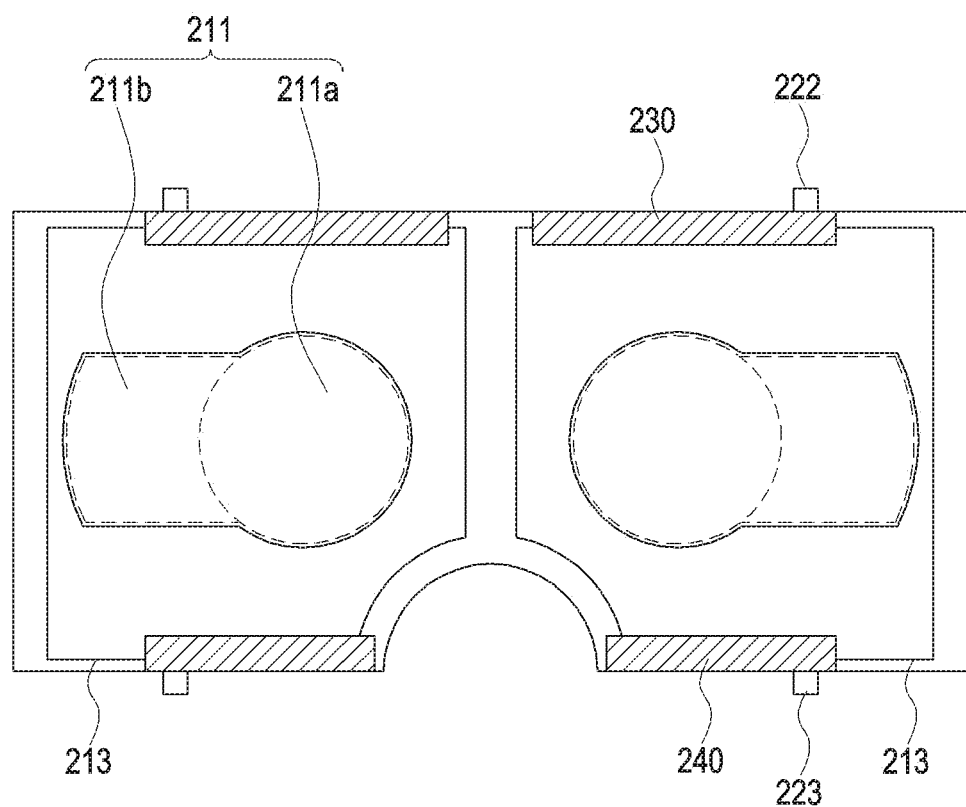
FIG. 5 is a view schematically illustrating the inner portion of the head-mounted electronic device according to various embodiments of the present disclosure in another direction.
Figure 6:
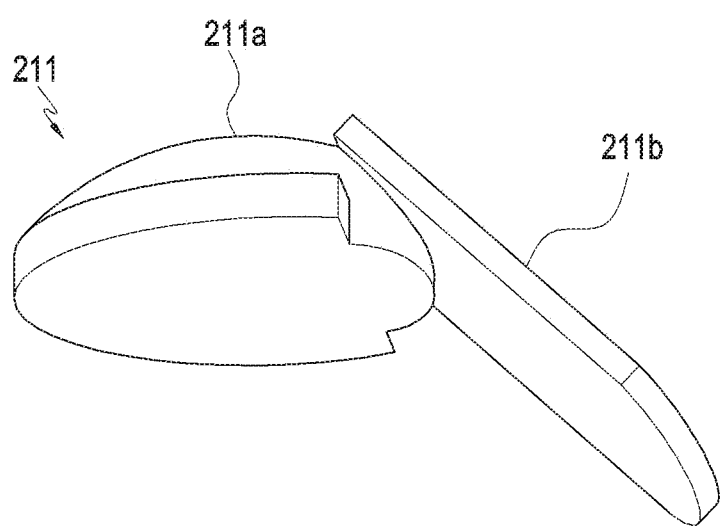
FIG. 6 is a view illustrating an optical assembly in the head-mounted electronic device according to various embodiments of the present disclosure.

FIG. 3 is a view illustrating the wearing state of the head-mounted electronic device according to various embodiments of the present disclosure in another direction. FIG. 4 is a view schematically illustrating the inner portion of the head-mounted electronic device according to various embodiments of the present disclosure. FIG. 5 is a view schematically illustrating the inner portion of the head-mounted electronic device according to various embodiments of the present disclosure in another direction. FIG. 6 is a view illustrating an optical assembly in the head-mounted electronic device according to various embodiments of the present disclosure. Referring to FIGS. 3 to 6, an optical assembly may be mounted in the inside of the frame 202, between the curved display and the face-contact surface 202a. The optical assembly may include left and right lens assemblies 211 at the left and right inside the frame 202 to correspond to the left and right eyes of the user and is configured to provide an image of the display 201 to the user's left and right eyes.

A first lens 211a and a second lens 211b may be provided as one pair on the left lens assembly 211 and the right lens assembly 211, respectively. That is, the left lens assembly 211 may be provided with a first lens 211a capable of forming a view angle of a left binocular visual field A and a second lens 211b forming a view angle of a left additional visual field. The right lens assembly 211 may be provided with a first lens 211a capable of forming a view angle of a right binocular visual field and a second lens 211b capable of forming a view angle of a right additional visual field. Hereinafter, since the left and right lens assemblies 211 are identical to each other in structure and only differ in arrangement, a description of one lens assembly 211 may be substituted for the description of another lens assembly 211.

The lens assembly 211 may include lenses bent (obliquely arranged) at a predetermined angle at positions, which correspond to the eyes of the wearer, respectively, and may be installed on the inner face of the frame 202. The wearer can see various virtual reality images reproduced on the bent display 201 through the lenses. When the user wears the head-mounted electronic device 200, one faces of the lenses are exposed to the side of the face-contact surface 202a to be described later so that the screen of the display 201 can be seen by the user's eyes, and the other faces of the lenses may be exposed toward the mounting surface 202b side so that the screen of the curved display 201 can be seen.

The lens assembly 211 may be provided with lenses having two different functions such as the first lens 211a and the second lens 211b, and the first lens 211a and the second lens 211b may be provided to have a predetermined angle.

The second lens 211b may be inclined at an angle of, for example, 20 to 50 degrees with respect to the first lens 211a and may be configured with a Fresnel lens. The second lens 211b of the left lens assembly 211 may form an additional view angle of 60 to 100 degrees on the left side and the second lens 211b of the right lens assembly 211 may form an additional view angle of 60 to 100 degrees so that an overall view angle between 160 and 200 degrees can be formed through the first lens 211a and the second lens 211b to form an ultra-wide angle corresponding to the user's viewing angle.

Figure 7:
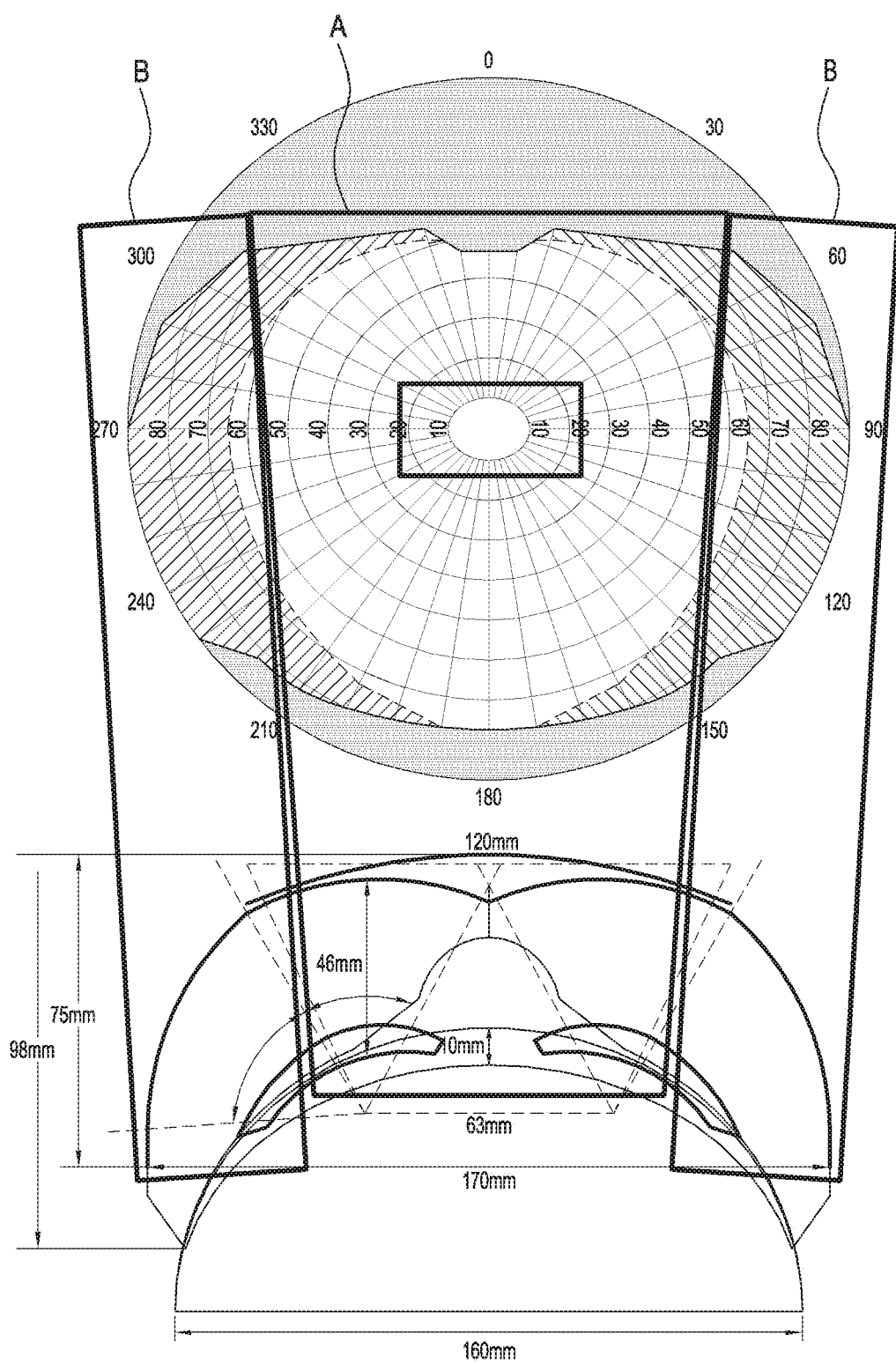
FIG. 7 is a diagram illustrating a binocular visual field and a peripheral visual field according to an optical assembly in the head-mounted electronic device according to various embodiments.

FIG. 7 is a diagram illustrating a binocular visual field A and a peripheral visual field B according to the optical assembly 210 in the head-mounted electronic device 200 according to various embodiments.

Referring to FIG. 7, the viewing angle that can be secured to the user can be confirmed through the left and right lens assemblies 211 of the present disclosure. That is, the binocular visual field A of the first lens 211a of the left lens assembly 211 and the first lens 211a of the right lens assembly 211 can be secured. This is a visual field that can be secured through conventional head-mounted electronic devices.

Various embodiments allow the second lens 211b of the left lens assembly 211 to secure a first additional viewing angle of the left portion of the binocular visual field. Further, the second lens 211b of the right lens assembly 211 makes it possible to secure a second additional viewing angle of the right side portion of the binocular visual field.

Therefore, it is possible to secure the visual field of the left additional viewing angle B1 portion and the right additional viewing angle B2 portion in the binocular visual field angle, so that the user can secure an image of the view angle suitable for the user's viewing angle.

Figure 8:
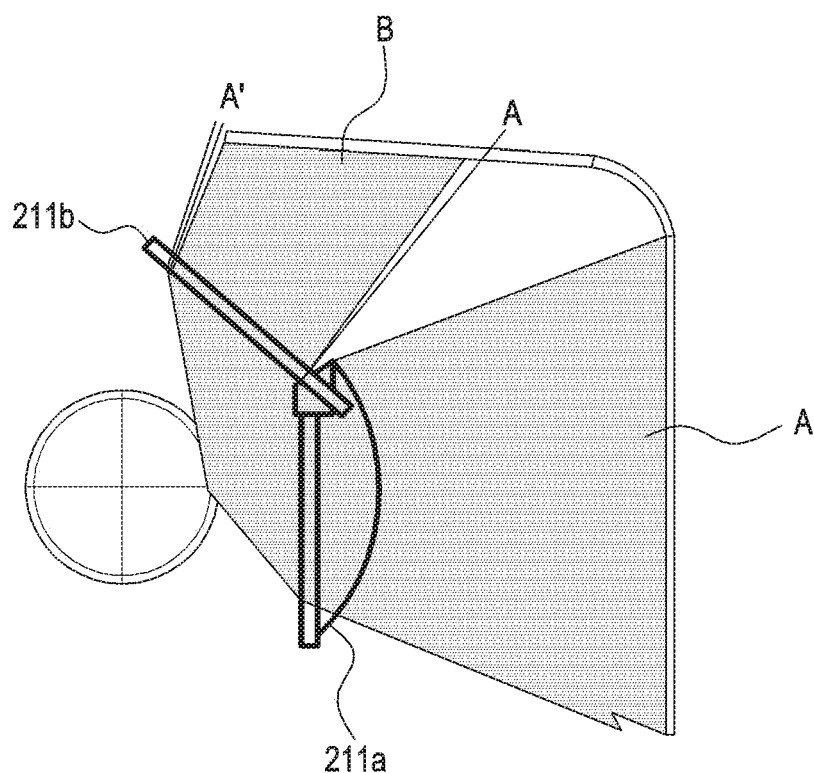
FIG. 8 is a diagram illustrating a binocular visual field and a peripheral visual field in the case in which a first lens and a second lens are coupled in the state of being disposed to be inclined at an angle of 50 degrees in the optical assembly of the head-mounted electronic device according to various embodiments.
Figure 9:
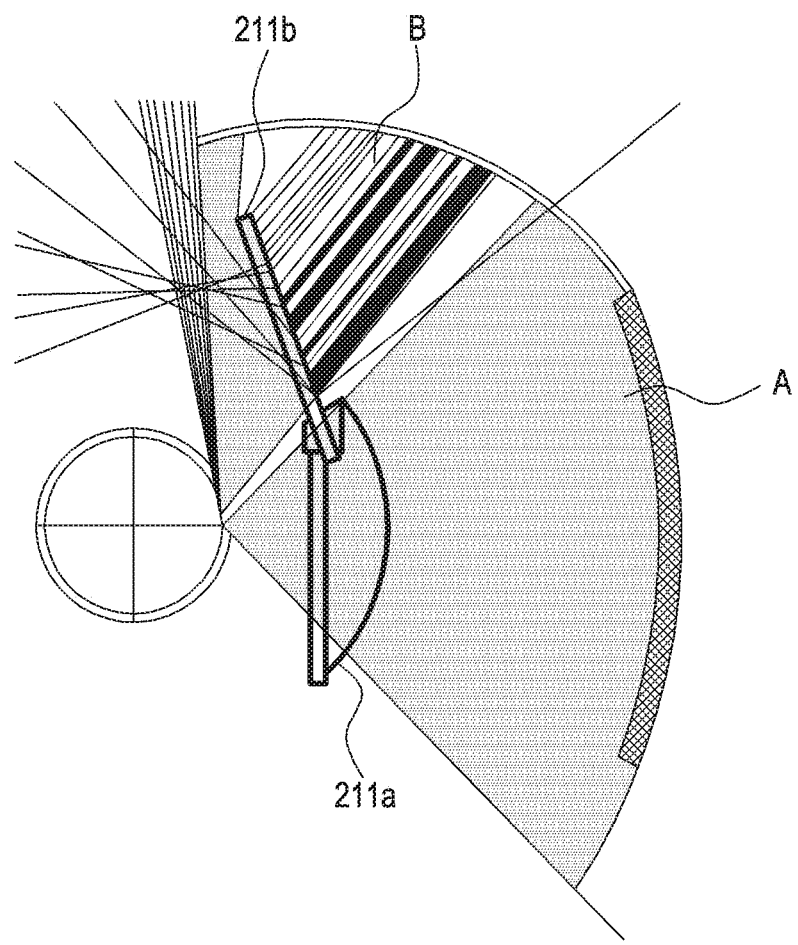
FIG. 9 is a diagram illustrating a binocular visual field and a peripheral visual field in the case in which the first lens and the second lens are coupled in the state of being disposed to be inclined at an angle of 20 degrees in the optical assembly of the head-mounted electronic device according to various embodiments.

FIG. 8 is a diagram illustrating a binocular visual field A and a peripheral visual field B when the first lens and the second lens are coupled at an inclined angle of 50 degrees in the optical assembly of the head-mounted electronic device 200 according to various embodiments. FIG. 9 is a diagram illustrating a state of securing a binocular visual field A and first and second peripheral visual fields when the first lens and the second lens are coupled at an inclined angle of 20 degrees in the optical assembly of the head-mounted electronic device 200 according to various embodiments.

For example, as illustrated in FIG. 8, when the second lens 211b is disposed to be inclined at an angle of 50 degrees with respect to the first lens 211a and the second lens 211b and the first lens 211a are coupled with each other to be bent, the user can confirm a viewing angle of 160 degrees as a whole according to the binocular visual field angle A of 100 degrees according to the first lens 211a and the peripheral visual field angle B of 30 degrees on each of the left and right sides according to the second lens 211b.

In addition, as illustrated in FIG. 9, when the second lens 211b is disposed to be inclined at an angle of 20 degrees with respect to the first lens 211a and the second lens 211b and the first lens 211a are coupled with each other to be bent, the user can confirm a view angle of 200 degrees as a whole according to the binocular visual field A of 100 degrees according to the first lens 211a and the peripheral visual field B of 50 degrees on each of the left and right sides according to the second lens 211b.

As described above, a small and lightweight ultra-wide angle lens can be formed through the first lens 211a, which forms a view angle of the binocular visual field A and is configured with an aspheric lens, and the second lens 211b, which is disposed to be inclined at a predetermined angle with respect to the first lens 211a and to be bent at the first lens 211a, forms a view angle of the peripheral visual field B, and is configured with a Fresnel lens.

In the inside of the frame 202, the lens frame 212 may further include a lens frame 212 configured to mount and support the optical assembly 210 thereon, and the lens frame 212 may include, in the inside thereof, left and right lens holders 213 configured to hold left and right lens holder 213, respectively. The left and right lens holders 213 may be provided to be movable in the front, rear, left, and right directions with respect to the lens frame 212 (see FIGS. 4 and 5).

The frame 202 may include, in the inside thereof, a pair of focus adjustment guides 230 for moving the optical assembly 210 to adjust the focus or the gap between the optical assemblies 210 and a pair of lens gap adjusting guides 240.

The pair of focus adjustment guides 230 may be provided between the left and right lens holders 213 and the lens frame 212, and may be provided to move the left and right lens holders 213 to the front and rear sides of the lens frame 212 so as to adjust the focuses of the left and right lens assemblies 211.

The focus adjustment guides 230 may be connected to control devices 220 exposed on the surface of the frame 202 described above, for example, the first position adjustment units 222 disposed on the upper face of the frame 202. That is, the first position adjustment units 222 and the focus adjustment guides 230 may be configured such that the first position adjustment units 222 are connected to the focus adjustment guides 230 such that the focus adjustment guides 230 are driven according to the adjustment of the first position adjustment units 222, and the left and right lens holders 213 may be provided to be driven to the front and rear sides of the lens frame 212 according to the driving of the focus adjustment guides 230.

The focus adjustment guide 230 and the first position adjustment unit 222 may be formed in gear shapes that are engaged with each other. Alternatively, the focus adjustment guide 230 may be formed by a motor or the like, and the first position adjustment unit 222 may be formed by a button for adjusting the motor. Thus, the first position adjustment unit 222 and the focus adjustment guide 230 may be configured such that as the first position adjustment unit 222 and the focus adjustment guide 230, which are engaged with each other in gear shapes, move according to the adjustment of the first position adjustment unit 222, the left and right lens holders 213 may move to the front and rear sides of the frame 202, or as the first position adjustment unit 222 is pushed so that the motor is driven, the left and right lens holders 213 may be driven to the front and rear sides of the lens frame 212.

A pair of lens gap adjustment guides 240 are provided between the left and right lens holders 213 and the lens frame 212 and move the left and right lens holders 213 to the left and right sides of the lens frame 212, so that the distance between the left and right lens holders 213, specifically, the distance between the left and right lens assemblies 211 can be adjusted.

The lens gap adjustment guides 240 may be connected to control devices 220 exposed on the surface of the frame 202 described above, for example, the second position adjustment units 223 disposed on the lower face of the frame 202. That is, the second position adjustment units 223 and the focus adjustment guides 240 may be configured such that the second position adjustment units 223 are connected to the lens gap adjustment guides 240 such that the lens gap adjustment guides 240 are driven according to the adjustment of the second position adjustment units 223, and the left and right lens holders 213 may be provided to move to the left and right sides of the lens frame 212 according to the driving of the focus adjustment guides 230.

The lens gap adjustment guide 240 and the second position adjustment unit 223 may be formed in gear shapes that are engaged with each other. Alternatively, the lens gap adjustment guide 240 may be formed by a motor or the like, and the second position adjustment unit 223 may be formed by a button for adjusting the motor. Thus, the second position adjustment unit 223 and the lens gap adjustment guide 240 may be configured such that as the second position adjustment unit 223 and the focus adjustment guide 230, which are engaged with each other in gear shapes, move according to the adjustment of the second position adjustment unit 223, the left and right lens holders 213 may move to the left and right sides of the frame 202, or as the second position adjustment unit 223 is pushed so that the motor is driven, the left and right lens holders 213 may be driven to the left and right sides of the lens frame 212, respectively.

Although not illustrated, a third position adjustment unit 224, which can adjust the position of the display 201 to at least a portion of the frame 202, for example, to a side of the frame 202, may be provided.

Figure 10A:
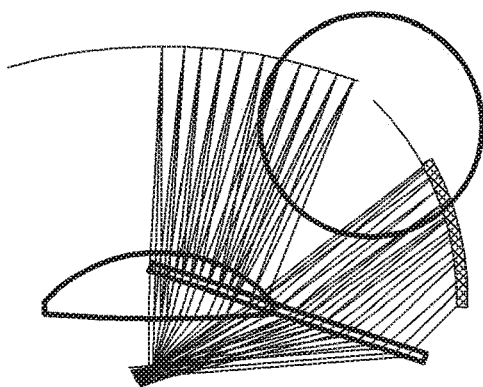
FIGS. 10A to 10C are diagrams illustrating correction of a discontinuous section by an image correction processing unit in the head-mounted electronic device according to various embodiments.
Figure 10B:
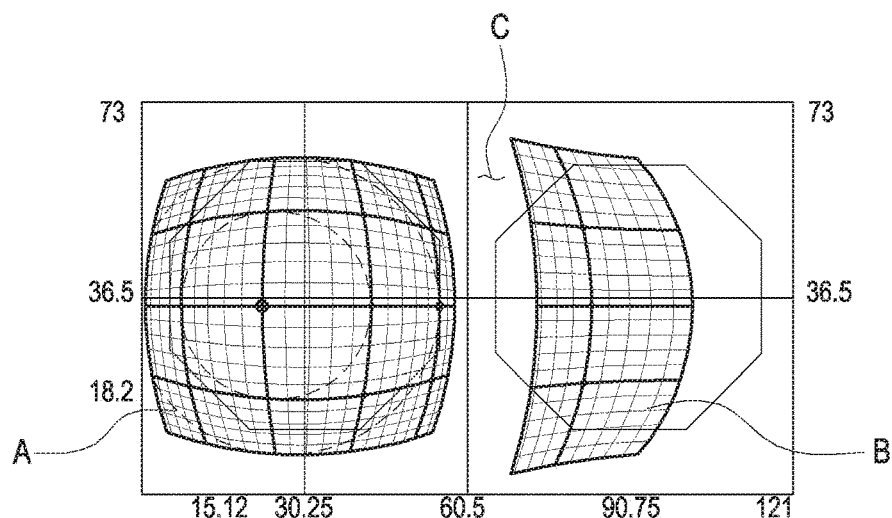
Figure 10C:
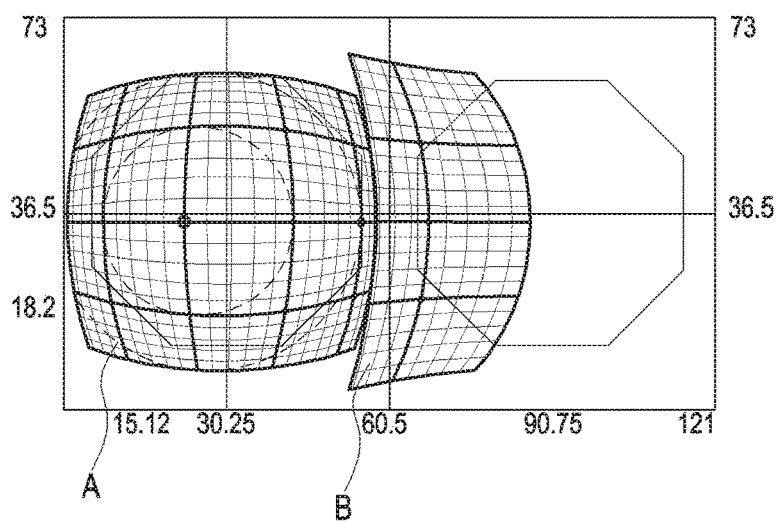
Figure 11:
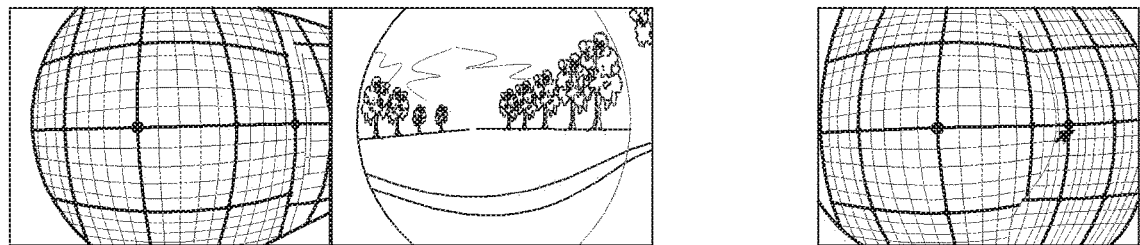
FIG. 11 illustrates images showing a discontinuous section by an image correction processing unit in the head-mounted electronic device according to various embodiments before and after correction.
Figure 11:
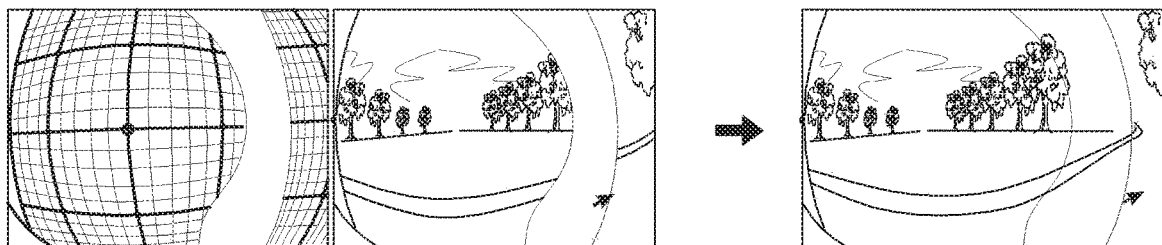

FIGS. 10A to 10C are diagrams illustrating correction of a discontinuous section by an image correction processing unit in the head-mounted electronic device 200 according to various embodiments. FIG. 11 illustrates images showing a discontinuous section by an image correction processing unit in the head-mounted electronic device 200 according to various embodiments before and after correction.

The optical assembly 210 according to one embodiment is provided with a first lens 211a forming a binocular visual field A and a second lens 211b inclined with respect to the first lens 211a. Since the first lens 211a and the second lens 211b are disposed to be inclined relative to each other so as to have a predetermined angle, an inclined boundary plane (also referred to as a "bending plane") is formed between the first lens 211a and the second lens 211b.

Due to such a bending plane, a screen may not be continuous between the binocular visual field A of 120 degrees and the peripheral visual field B from 120 degrees to 200 degrees, and a discontinuous section may be generated to be seen as a black screen. The head-mounted electronic device 200 may be provided with an image correction processing unit in order to correct a discontinuous section generated between the angle of the binocular visual field A and the angle of the peripheral visual field B.

The image correction processing unit may correct the image by making images of predetermined regions of both ends of the binocular visual field A overlap images of predetermined regions of angles of the left and right peripheral visual fields B.

That is, the image correction processing unit may determine and correct a set value of the overlapped regions according to the angle between the first lens 211a and the second lens 211b.

Figure 12:
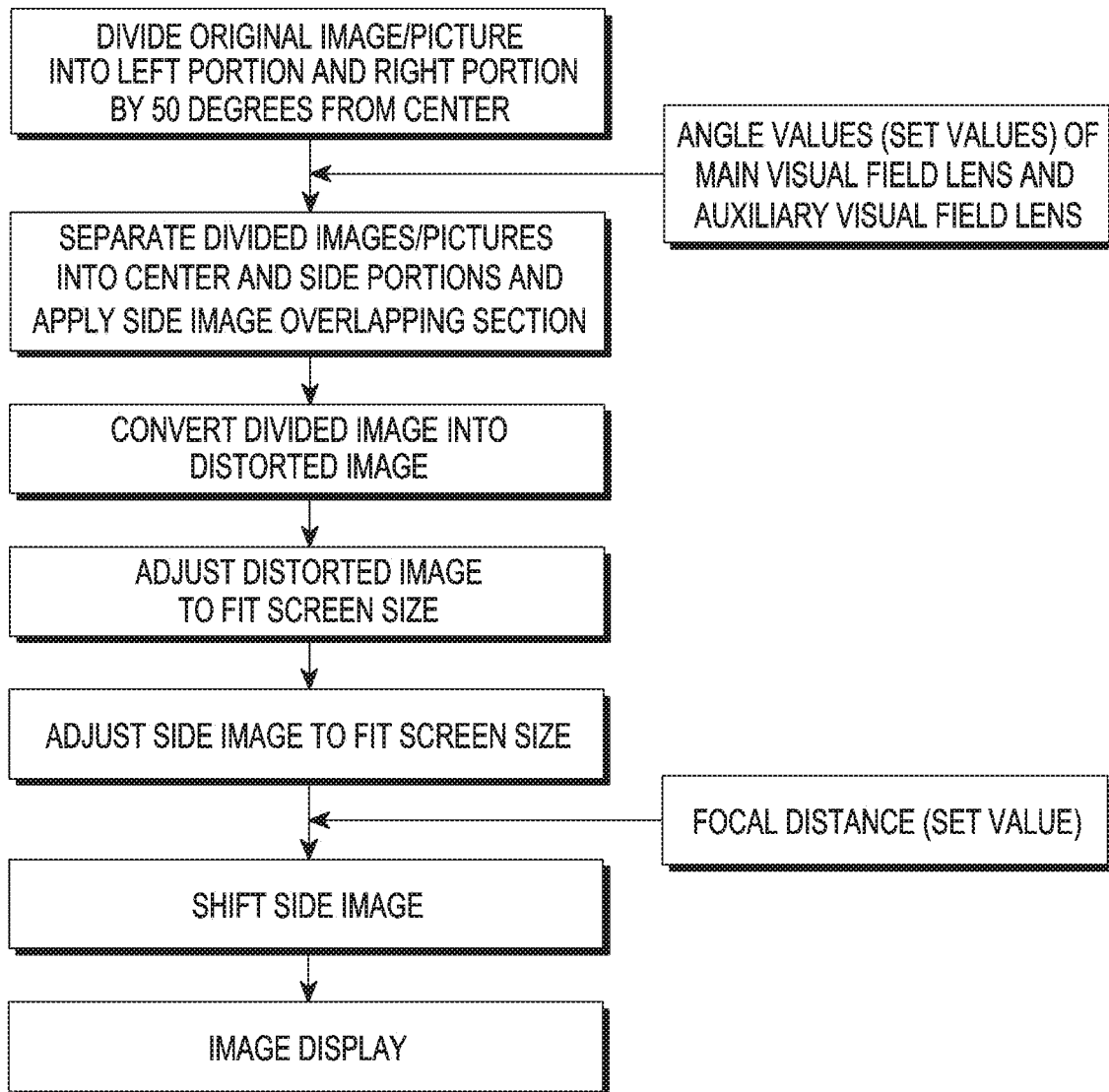
FIG. 12 is a flowchart illustrating an image correction process in the head-mounted electronic device according to various embodiments.
Figure 13:
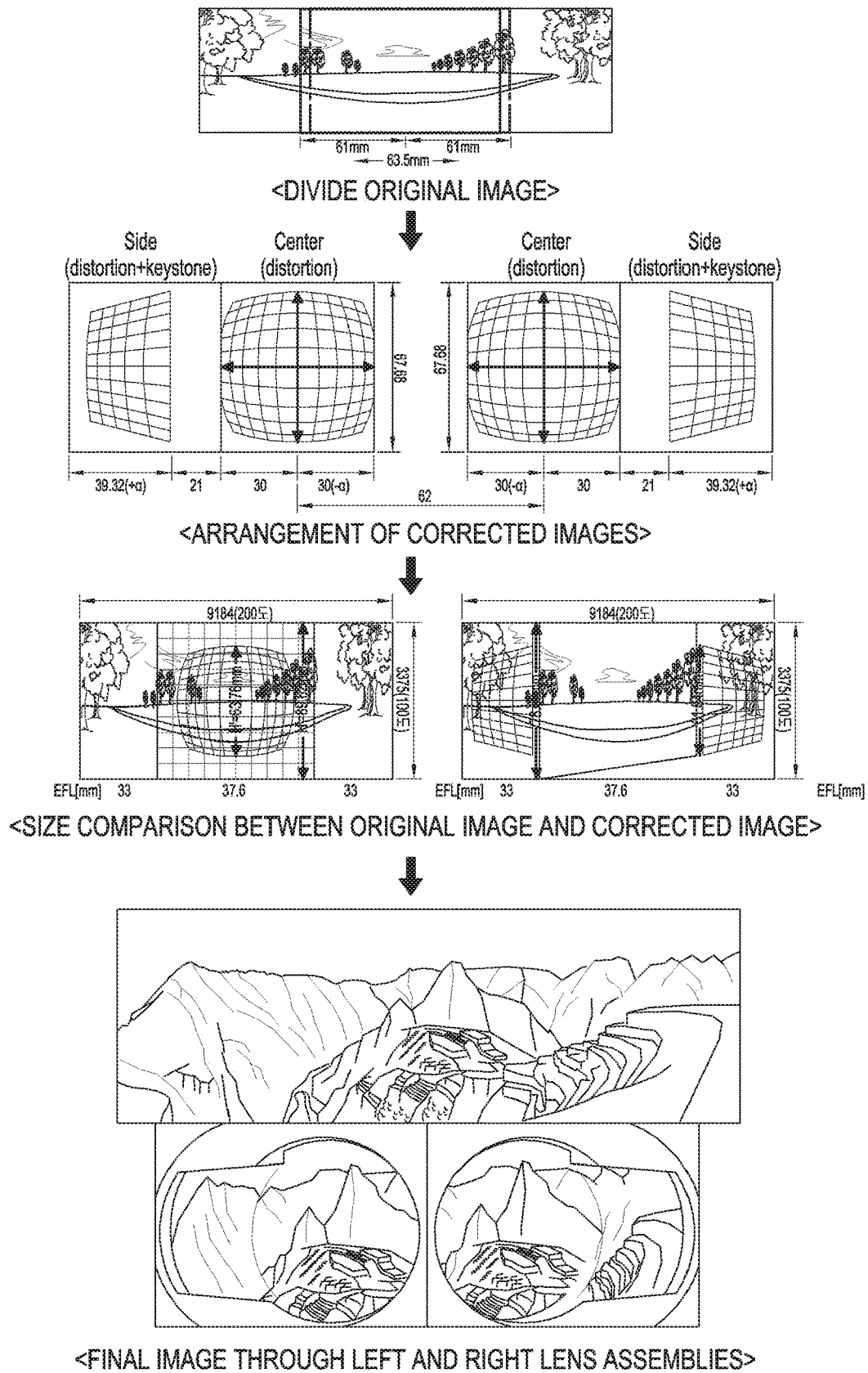
FIG. 13 is a diagram illustrating an image correction procedure according to an image correction process in the head-mounted electronic device according to various embodiments.

FIG. 12 is a flowchart illustrating an image correction process in the head-mounted electronic device 200 according to various embodiments. FIG. 13 is a diagram illustrating an image correction procedure according to an image correction process in the head-mounted electronic device 200 according to various embodiments.

Referring to FIGS. 12 and 13, for example, the original image or the original picture displayed on the display 201 may be divided into left and right portions based on 50 degrees from the center, and the divided images or the original picture may be divided into a center portion and side portions. The image correction processing unit may set the size of the overlapped region of the side portions according to a value set according to the angle between the first lens 211a and the second lens 211b.

The divided image or screen may be converted into a distorted image and may be adjusted to fit the screen size of the distorted image.

The side image adjusted to fit the screen size of the distorted image is subjected to a side image shift image process according to the focal distance setting value set in the image correction processing unit so that an image having a view angle of 160 to 180 may be delivered to the user.

Figure 14:
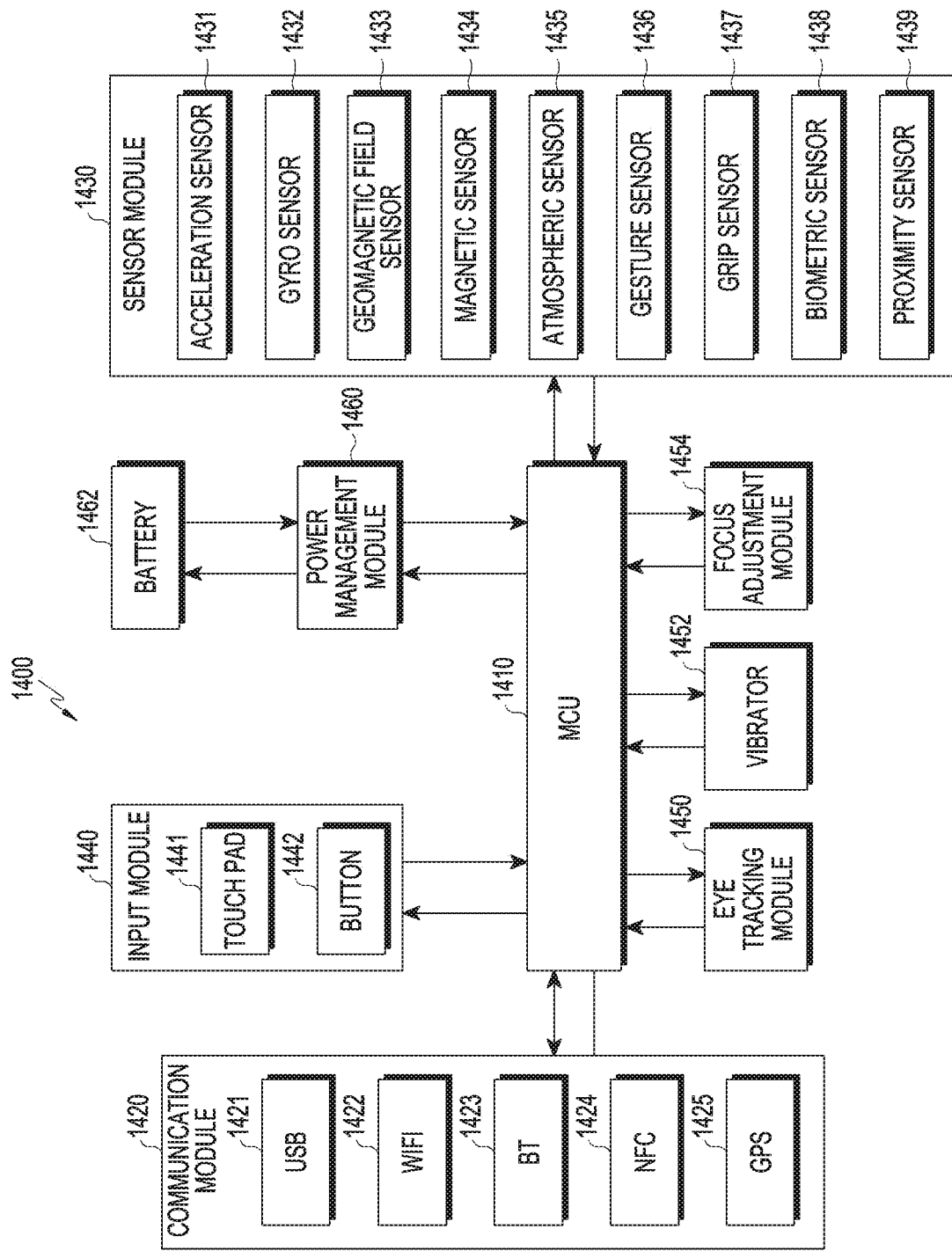
FIG. 14 is a block diagram illustrating an exemplary configuration of the head-mounted electronic device according to various embodiments.

FIG. 14 is a block diagram illustrating an exemplary configuration of the head-mounted electronic device according to various embodiments.

Referring to FIG. 14, a head-mounted electronic device 1400 may include a Micro Controller Unit (MCU) 1410, a communication module 1420, a sensor module 1430, an input module 1440, an eye tracking module 1450, a vibrator 1452, a focus adjustment (adjustable optics) module 1454, a power management module 460, and a battery 1462, in addition to the previously described components.

The MCU 1410 may be a control unit of the device 1400 that is capable of driving an operation system or an embedded software program so as to control other components (e.g., the communication module 1420, the sensor module 1430, the input module 1440, the eye tracking module 1450, the vibrator 1452, the focus adjustment (adjustable optics) module 1454, and the power management module 1460). The MCU 410 may include a processor and a memory.

The communication module 1420 may perform data transmission and reception by electrically connecting the portable electronic device and the device 1400 using wired communication or wireless communication. According to one embodiment, the communication module 1420 may include a USB module 1421, a WiFi module 1422, a BT module 1423, an NFC module 1424, and a GPS module 1425. According to one embodiment, at least two of the USB module 1421, the WiFi module 1422, the BT module 1423, the NFC module 1424, and the GPS module 1425 may be integrated into one Integrated Chip (IC) or IC package.

The sensor module 1430 may measure a physical quantity or may sense the operating state of the device 1400, and may convert the measured or sensed information into electrical signals. The sensor module 1430 may include at least one of, for example, an acceleration sensor 1431, a gyro sensor 1432, a geomagnetic field sensor 1433, a magnetic sensor 1434, a atmospheric sensor 1435, a gesture sensor 1436, a grip sensor 1437, a biometric sensor 1438, and a proximity sensor 1439. The device 1400 may sense the movement of the wearer's head on which the device 1400 is worn using at least one of the acceleration sensor 1431, the gyro sensor 1432, and the geomagnetic sensor 1433. The device 1400 may determine whether or not the device 1400 is worn using the proximity sensor 1435 or the grip sensor 1437. According to one embodiment, the device 1400 may sense at least one of an infrared (IR) recognition, a pressure recognition, and a change in capacitance (or permittivity) as the user wears the device 1400. The gesture sensor 1436 may sense the movement of the user's hand or finger and may receive the movement as an input operation of the device 1400. The device 1400 may sense that a thing is approaching the wearer of the device 1400 using the proximity sensor 1439. Additionally or alternatively, the sensor module 1430 may include a biometric sensor, for example, an e-nose sensor, an electromyography (EMG) sensor, an electroencephalogram (EEG) sensor, an electrocardiogram (ECG) sensor, an iris sensor, a fingerprint sensor, or the like and may recognize the biometric information of the user using the biometric sensor. The sensor module 1430 may further include a control circuit for controlling one or more sensors incorporated therein.

The input module 1440 may be the control device 214 of FIG. 2. The input module 1440 may accept input from a user. The input module 1440 may include a touch pad 1441 and a button 1442. The touch pad 1441 is able to recognize touch input using at least one of, for example, an electrostatic scheme, a pressure sensitive scheme, an infrared scheme, or an ultrasonic scheme. The touch pad 1441 may further include a control circuit. The capacitive scheme is able to recognize a physical contact or proximity. The touch panel 1441 may further include a tactile layer. In this case, the touch pad 1440 may provide a tactile reaction to the user. The button 1442 may include, for example, a physical button, an optical key, or a keypad.

The power management module 1460 may manage the electric power of the device 1400. Although not illustrated, the power management module 1460 may include, for example, a Power Management Integrated Circuit (PMIC), a Charging Integrated Circuit (IC), or a battery gauge.

The PMIC may be equipped inside, for example, an integrated circuit or an SoC semiconductor. The charging type may be classified into a wired type and a wireless type. The charging IC may charge the battery, and may prevent inflow of overvoltage or overcurrent from a charger. According to one embodiment, the charging IC may include a charging IC for at least one of a wired charging method and a wireless charging method. The wireless charge type may include, for example, a magnetic resonance type, a magnetic induction type, or an electromagnetic wave type, and may further include an additional circuit for wireless charging, such as a coil loop, a resonance circuit, a rectifier, or the like.

The battery gauge is able to measure the remaining amount of the battery 1462, and voltage, current, or temperature during the charging. The battery 1462 may store electricity to supply power. The battery 1462 may include, for example, a rechargeable battery or a solar battery.

The eye tracking module 1450 is able to track the user's gaze using at least one of, for example, an electrogalcography (EOG) sensor, a coil system, a dual purkinje system, a bright pupil system, a dark pupil system. In addition, the eye tracking module 1450 may further include a micro camera for gaze tracking.

The focus adjustment module 1454 is able to measure an inter-pupil distance (IPD) of the user so that the user can view an image suitable for his/her sight. The device 1400 is able to adjust the distance of the lens according to the distance between the user's eyes measured through the focus adjustment module 1454. The device 1400 may adjust the display position of a screen through the display of the portable electronic device by transmitting the distance between the user's eyes measured through the focus adjustment module 454 to the portable electronic device.

The MCU 1410 may transmit a motion signal sensed by a motion sensor of the sensor module 1430 to the portable electronic device. The motion sensor may be at least one of an acceleration sensor 1431, a gyro sensor 1432, and a geomagnetic field sensor 1433.

The MCU 1410 may sense through the proximity sensor 439 that a thing is approaching the wearer of the device 1400 and may transmit a proximity sensing signal to the portable electronic device. The MCU 1410 may measure the direction in which the thing approaches the wearer of the device 400 through the proximity sensor 439 and may transmit the measurement result to the portable electronic device.

As the proximity sensor 1439, a space recognition sensor such as an infrared (IR) sensor, an ultrasonic sensor, a radio frequency (RF) sensor, a radar, or the like may be used. As the RF sensor, a Wisee sensor, an Allsee sensor, or the like may be used. In one embodiment, a wireless communication module may be used as the proximity sensor 1439. The wireless communication module may be at least one of the WiFi module 1422, the BT module 1423, the NFC module 1424, and the GPS module 1425. When a thing approaches the device 1400, the intensity of the received electric field of a wireless communication signal received by the wireless communication module may be weakened due to a thing approaching the device. When the received electric field intensity suddenly drops to a difference larger than the designated threshold value while the wearer of the device 1400 is not moving, the MCU 1410 is able to sense that the thing is approaching. In addition, the MCU 1410 is able to sense the direction in which the intensity of the received electric field suddenly drops to a difference larger than the designated threshold value as the direction in which the thing is approaching.

The embodiments of the present disclosure described in the specification and shown in the drawings are merely specific examples presented in order to easily describe the technical details of the present disclosure and to help the understanding of the details, and are not intended to limit the scope of the present disclosure. Therefore, it should be construed that, in addition to the embodiments disclosed herein, all modifications and changes or modified and changed forms derived from the technical idea of various embodiments of the present disclosure fall within the scope of the present disclosure.

The invention claimed is:

1. A head-mounted electronic device comprising:
    a curved display;
    a frame having a mounting surface having a curvature such that the curved display is mounted thereon and a face contact surface that faces and is configured to be worn on a user's face;
    a pair of optical assemblies, which are provided on a left side and a right side within the frame, respectively, to provide an image of the curved display to a left eye and a right eye of the user; and
    an image correction processing unit configured to correct the image by overlapping discontinuous sections along bending faces of a first lens and a second lens,
    wherein the pair of optical assemblies comprise the first lens that forms a view angle of a binocular visual field and the second lens arranged to slope with regard to the first lens and form an additional view angle of a left visual field or a right visual field.

2. The head-mounted electronic device of claim 1,
    wherein the curved display is provided such that a proximate end and a distal end of the curved display or the entire curved display are curved with a first curvature, and
    wherein a curved length between the proximate end and the distal end of the curved display is formed to be larger than a viewing angle of the user.

3. The head-mounted electronic device of claim 1, wherein the curved display is formed in a hemispherical shape or semi-elliptical shape.

4. The head-mounted electronic device of claim 1, wherein the curved display is fixedly or removably mounted on the frame.

5. The head-mounted electronic device of claim 3,
    wherein the first lens comprises an aspherical lens, and
    wherein the second lens comprises a Fresnel lens.

6. The head-mounted electronic device of claim 5,
    wherein the first lens and the second lens are inclined at an angle between 20 degrees and 50 degrees, and
    wherein a viewing angle is formed at 160 degrees to 200 degrees.

7. The head-mounted electronic device of claim 1, further comprising:
    a lens frame configured to mount and support an imaging optical system on an inside of the frame; and
    a lens holder configured to fix the imaging optical system to be movable in left, right, front, and rear directions in the lens frame.

8. The head-mounted electronic device of claim 7, further comprising:
    a pair of focus adjustment guides configured to adjust a focus by moving the lens holder forward and backward.

9. The head-mounted electronic device of claim 8, further comprising:
    a lens gap adjustment guide configured to move the lens holder to a left side and a right side to adjust a distance between a left lens assembly and a right lens assembly of the imaging optical system.

10. The head-mounted electronic device of claim 9, wherein the frame is provided with a control device configured to control driving of the pair of focus adjustment guides and the lens gap adjustment guide.

11. The head-mounted electronic device of claim 1, wherein the image correction processing unit applies an overlapping section according to an inclined angle of the first lens and the second lens.

* * * * *